United States Patent
Noguchi et al.

(10) Patent No.: US 7,561,810 B2
(45) Date of Patent: Jul. 14, 2009

(54) OPTICAL COMMUNICATION APPARATUS

(75) Inventors: Masaji Noguchi, Kawasaki (JP); Tomohiro Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 498 days.

(21) Appl. No.: 11/543,026

(22) Filed: Oct. 5, 2006

(65) Prior Publication Data
US 2007/0269223 A1 Nov. 22, 2007

(30) Foreign Application Priority Data
May 22, 2006 (JP) .............................. 2006-141530

(51) Int. Cl.
*H04B 10/04* (2006.01)
*H04B 10/12* (2006.01)

(52) U.S. Cl. ....................... 398/198; 398/182; 398/183; 398/188; 398/192; 398/194; 398/195; 398/200; 359/237; 359/238; 359/239

(58) Field of Classification Search ................. 398/182, 398/183, 188, 192, 194, 195, 198, 200; 359/237, 359/238, 239
See application file for complete search history.

(56) References Cited

U.S. PATENT DOCUMENTS

| | | | |
|---|---|---|---|
| 5,170,274 A | | 12/1992 | Kuwata et al. |
| 5,629,792 A | | 5/1997 | Masaki |
| 5,850,305 A | * | 12/1998 | Pidgeon ..................... 398/193 |
| 6,317,249 B1 | * | 11/2001 | Nakamoto et al. .......... 359/279 |
| 6,687,451 B1 | * | 2/2004 | Sikora ......................... 398/187 |
| 7,340,184 B2 | * | 3/2008 | Frederiksen et al. ........ 398/198 |
| 7,398,023 B2 | * | 7/2008 | Mazurczyk et al. ......... 398/198 |
| 2005/0068600 A1 | | 3/2005 | Ogura |

FOREIGN PATENT DOCUMENTS

CA 2 520 633 A1 10/2004

OTHER PUBLICATIONS

Patent Abstract of Japan, Japanese Publication No. 2004-245968, Published Sep. 2, 2004. (1pg).

* cited by examiner

*Primary Examiner*—Ken N Vanderpuye
*Assistant Examiner*—Daniel G Dobson
(74) *Attorney, Agent, or Firm*—Staas & Halsey LLP

(57) ABSTRACT

An optical communication apparatus for controlling the operating point of an optical modulation unit appropriately. An adding unit adds a bias voltage and a pilot signal. An optical modulation unit modulates light by an electrical signal, performs further modulation by a signal from the adding unit, and outputs an optical signal. A monitor unit monitors the level of the optical signal and outputs a monitor signal. A reference signal output unit outputs a reference in phase with the pilot signal contained in the monitor signal. A synchronous pilot-signal detection unit performs synchronous detection of the monitor signal by using the reference. A synchronous noise detection unit extracts noise from the monitor signal and performs synchronous detection of the noise by using the reference. A control signal output unit subtracts the synchronous detection value of the noise from that of the monitor signal, and outputs a control signal.

7 Claims, 15 Drawing Sheets

OPTICAL COMMUNICATION APPARATUS

CROSS-REFERENCE TO RELATED APPLICATIONS

This application is based upon and claims the benefits of priority from the prior Japanese Patent Application No. 2006-141530, filed on May 22, 2006, the entire contents of which are incorporated herein by reference.

BACKGROUND OF THE INVENTION

1. Field of the Invention

The present invention relates to optical communication apparatuses, and particularly to an optical communication apparatus which modulates an electrical signal to an optical signal and transmits the optical signal.

2. Description of the Related Art

Current multimedia networks require optical communication apparatuses that can cover a very long distance and have a high capacity. Current optical communication apparatuses use an optical modulator as an electrical-optical converter.

FIG. 12 shows the configuration of an optical communication system. As shown in the figure, the optical communication system can be divided into a wavelength division multiplexing (WDM) transmission block for sending an optical signal, a transmission path for transmitting the optical signal, and a WDM reception block for receiving the optical signal. The WDM transmission block and the WDM reception block are configured by separate optical communication apparatuses.

Optical signals S1a, S1b, . . . , and S1n input to the WDM transmission block use a standard optical interface, which is the Synchronous Digital Hierarchy (SDH) or the Synchronous Optical Network (SONET). Optical-electrical converters (O/Es) 101a, 101b, . . . , and 101n convert the optical signals S1a, S1b, . . . , and S1n to electrical signals and supply the signals to optical modulators 103a, 103b, . . . , and 103n.

The optical modulators 103a, 103b, . . . , and 103n receive light with different wavelengths from light sources 102a, 102b, . . . , and 102n. The optical modulators 103a, 103b, . . . , and 103n modulate the light output from the light sources 102a, 102b, . . . , and 102n in accordance with the electrical signals output from the O/Es 101a, 101b, . . . , and 101n, and output optical signals with wavelengths of λ1, λ2, . . . , and λn to an optical multiplexer 104. The optical multiplexer 104 wavelength-multiplexes the optical signals with wavelengths of λ1, λ2, . . . , and λn and outputs the result to the transmission path.

The transmission path includes, for instance, optical fibers 111 and 113 and an optical amplifier 112, as shown in the figure. The optical amplifier 112 amplifies the optical signal attenuated in the transmission path.

An optical demultiplexer 121 of the WDM reception block divides the optical signal transmitted through the transmission path to optical signals with wavelengths of λ1, λ2, . . . , and λn. Photodetectors 122a, 122b, . . . , and 122n convert the divided optical signals with wavelengths of λ1, λ2, . . . , and λn to electrical signals and output the signals to electrical-optical converters (E/Os) 123a, 123b, . . . , and 123n. The E/Os 123a, 123b, . . . , and 123n convert the electrical signals from the photodetectors 122a, 122b, . . . , and 122n to optical signals S2a, S2b, . . . , and S2n of a standard optical interface, SDH or SONET, and output the signals to a subsequent circuit. Signals are sent and received as described here.

The shown optical modulator 103a will be described in further detail. FIG. 13 is a block diagram showing the configuration of a conventional optical modulator. FIG. 13 shows the configuration of the optical modulator 103a shown in FIG. 12. The figure also shows the light source 102a shown in FIG. 12. The optical modulators 103b to 103n shown in FIG. 12 have the same configuration as the optical modulator 103a, and a description of those optical modulators will be omitted.

The optical modulator 103a includes an optical intensity modulator 131, which is an interference-type optical modulation element, a driver 132, an optical tap 133, a photodiode (PD) 134, and an automatic bias control (ABC) circuit 135.

The driver 132 receives data and a clock. The data input to the driver 132 is an electrical signal output from the O/E 101a, described with reference to FIG. 12. When a 10-Gb/s clock is input, for instance, the driver 132 outputs 10-Gb/s data to the optical intensity modulator 131.

A modulating electrode 131a of the optical intensity modulator 131 intensity-modulates the light output from the light source 102a in accordance with the data output from the driver 132. The optical intensity modulator 131 outputs the modulated data (optical signal) to the optical multiplexer 104, which was described with reference to FIG. 12, and a part of the data is branched by the optical tap 133 to the PD 134. The PD 134 detects the optical level of the optical signal and outputs it as an electrical signal to the ABC circuit 135.

When an interference-type optical modulation element is used to perform optical modulation, a direct-current (DC) voltage (bias voltage) is applied to the modulation signal in order to fix the operating point of electrical-optical conversion to a certain position. In FIG. 13, a bias voltage is applied to an electrode 131b of the optical intensity modulator 131. The operating point of the interference-type optical modulation element, however, varies with time or varies with the applied voltage or the like, and a drift is generated. Accordingly, the ABC circuit 135 performs feedback control so that an optimum bias voltage is applied to the electrode 131b.

FIG. 14 is a block diagram showing the configuration of the ABC circuit 135. A DC bias generator 141 of the ABC circuit 135 outputs a digital bias voltage that determines the operating point of the optical modulation signal. A digital-to-analog converter (DAC) 142 converts the bias voltage to an analog signal, and a non-inverting amplifier 143 amplifies the voltage. The non-inverting amplifier 143 outputs the analog bias voltage to an adder 146.

A pilot signal generator 144 generates a pilot signal for detecting a shift of the operating point because of the bias voltage. A digital-to-analog converter (DAC) 145 converts the pilot signal to an analog signal. The adder 146 adds the converted analog pilot signal and the bias voltage, and an inverter 147 inverts the output. The inverter 147 outputs the inversion of the sum of the pilot signal and the bias voltage to the electrode 131b shown in FIG. 13.

The optical signal containing the pilot signal, optically modulated by the optical intensity modulator 131 shown in FIG. 13, goes through a waveguide of the optical intensity modulator 131, and the optical tap 133 branches a part of the signal to the PD 134. The PD 134 detects the optical level of the optical signal and outputs a corresponding electrical signal to a transfer impedance amplifier (TIA) 148. The TIA 148 extracts an alternating-current component of the electrical signal and performs current-voltage conversion. The electrical signal converted by the TIA 148 is filtered by a band pass filter (BPF) 149 having a center frequency of 1 kHz, that is, the pilot signal is extracted from the electrical signal. An amplifier (AMP) 150 amplifies the pilot signal in accordance with the input range of an analog-to-digital converter (ADC) 151, and the signal is converted to a digital signal.

The pilot signal generator 144 outputs the pilot signal also to a phase shifter 153. The phase shifter 153 adjusts the phase of the pilot signal output from the pilot signal generator 144, in consideration of a change in phase of the pilot signal output to a multiplier 152 through the optical intensity modulator 131 and the like. The multiplier 152 multiplies the digital pilot signal converted by the ADC 151 by a reference signal output from the phase shifter 153 and outputs the result to a low pass filter (LPF) 154. The LPF 154 extracts a direct-current component from the pilot signal multiplied by the multiplier 152 and outputs the component to a DC bias optimal control circuit 155.

The multiplier 152 and the LPF 154 perform synchronous detection (lock-in amplification) of the pilot signal. While the bias voltage is at the optimum operating point, 0 V is obtained as a result of synchronous detection. If the result is not 0 V, the DC bias optimal control circuit 155 changes the bias voltage of the DC bias generator 141 accordingly, so that the optimum operating point can be maintained. Through the operation as described here, the optimum value of the bias voltage is maintained.

FIGS. 15A to 15C illustrate the synchronous detection of the pilot signal. The pilot signal output from the ADC 151 is shown in FIG. 15A. The reference signal output from the phase shifter 153 is shown in FIG. 15B. The output of the multiplier 152 is shown in FIG. 15C.

FIG. 15C shows the result obtained by multiplying the pilot signal shown in FIG. 15A by the reference signal shown in FIG. 15B. When the LPF 154 passes the electrical signal shown in FIG. 15C, the pilot signal can be detected as a direct-current value.

One proposed optical modulator suppresses a shift of the operating point because of a variation in the power of light output from the modulator while specifying a desired operating point of an external modulator (refer to Japanese Unexamined Patent Application Publication No. 2000-171766, for instance). In contrast to a nest-type optical intensity modulator using a combination of three Mach-Zehnder (MZ) waveguides, one method is proposed to control the bias voltage of an optical modulator appropriately by a simple configuration, and one apparatus using the method is also proposed (refer to Japanese Unexamined Patent Application Publication No. 2004-318052, for instance).

If noise is large for the optically-modulated pilot signal, the signal output from a synchronous detection circuit (the multiplier 152 and the LPF 154, in the above case) contains an offset caused by the noise, and it is hard to control the operating point of the optical modulator appropriately.

SUMMARY OF THE INVENTION

In view of the foregoing, it is an object of the present invention to provide an optical communication apparatus which can appropriately control the operating point of an optical modulator by extracting noise from an optically modulated pilot signal and eliminating noise from a synchronous detection signal.

To accomplish the above object, according to one aspect of the present invention, there is provided an optical communication apparatus for modulating an electrical signal to an optical signal and transmitting the optical signal. This optical communication apparatus includes the following elements: a light source, a bias voltage generation unit for generating a bias voltage in accordance with a control signal, a pilot signal generation unit for generating a pilot signal, an adding unit for adding the pilot signal and the bias voltage, an optical modulation unit for modulating light from the light source in accordance with the electrical signal, performing modulation also in accordance with a signal from the adding unit, and outputting the optical signal, a monitor unit for monitoring the level of the optical signal and outputting a monitor signal, a reference signal output unit for outputting a reference signal which is in phase with the pilot signal contained in the monitor signal, a synchronous pilot-signal detection unit for performing synchronous detection of the monitor signal by using the reference signal, a synchronous noise detection unit for extracting noise from the monitor signal and performing synchronous detection by using the reference signal, and a control signal output unit for subtracting a synchronous detection value obtained by the synchronous noise detection unit from a synchronous detection value obtained by the synchronous pilot-signal detection unit and outputting the control signal.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The principle of the present invention will be described below in detail with reference to the drawings.

Figure 1:
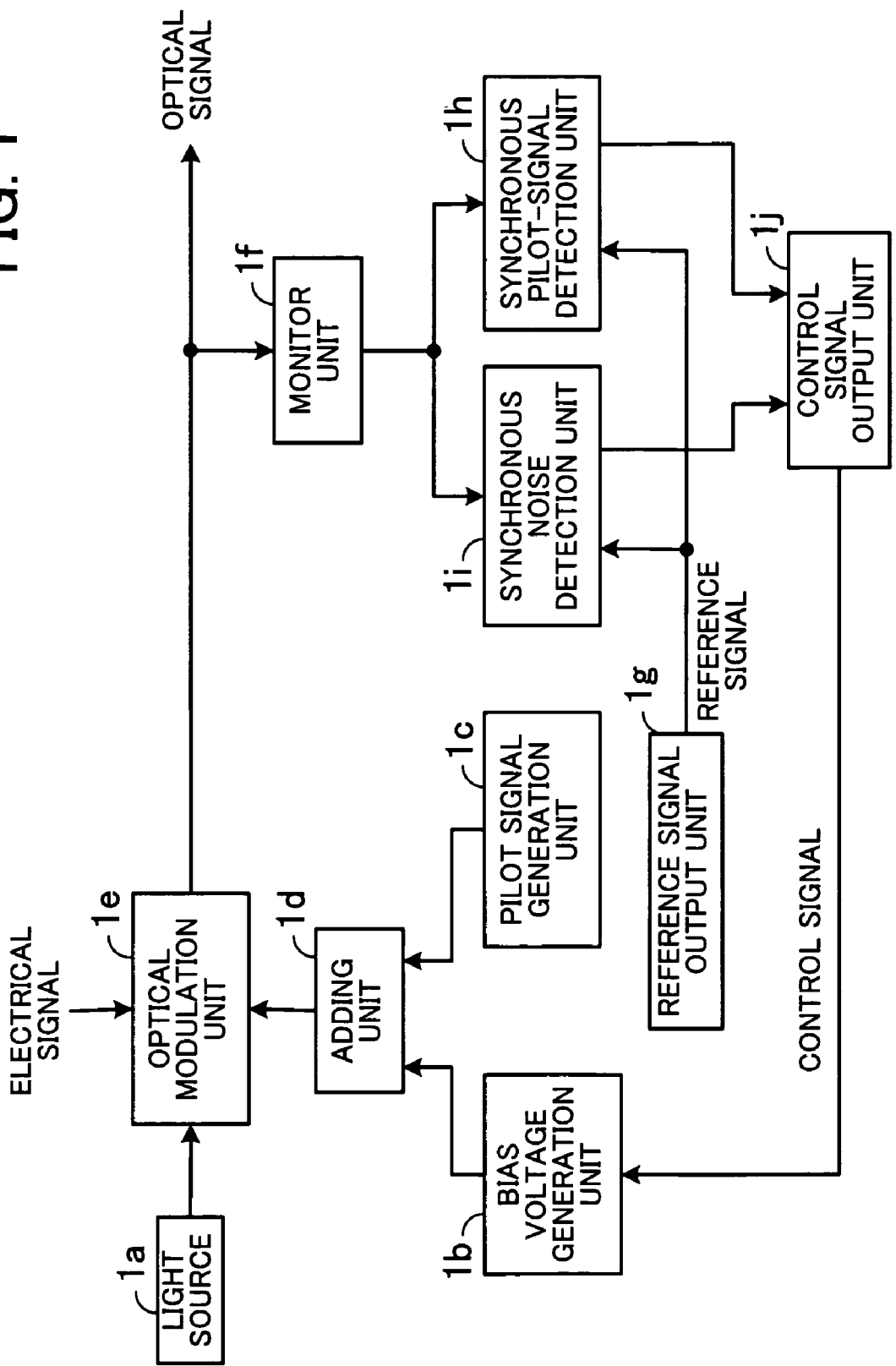
FIG. 1 is a view showing an overview of an optical communication apparatus.

FIG. 1 is a view showing an overview of an optical communication apparatus. As shown in the figure, the optical communication apparatus includes a light source 1a, a bias voltage generation unit 1b, a pilot signal generation unit 1c, an adding unit 1d, an optical modulation unit 1e, a monitor unit 1f, a reference signal output unit 1g, a synchronous pilot-signal detection unit 1h, a synchronous noise detection unit 1i, and a control signal output unit 1j.

The bias voltage generation unit 1b generates a bias signal for controlling the operating point of the optical modulation unit 1e in accordance with a control signal output from the control signal output unit 1j.

The pilot signal generation unit 1c generates a pilot signal for detecting a shift of the operating point of the optical modulation unit 1e, caused by the bias voltage. The pilot signal is a signal having a low frequency of 1 kHz, for instance.

The adding unit 1d adds the bias voltage output from the bias voltage generation unit 1b and the pilot signal output from the pilot signal generation unit 1c.

The optical modulation unit 1e modulates light output from the light source 1a in accordance with an electrical signal and in accordance with the signal added by the adding unit 1d.

The monitor unit 1f monitors the level of the optical signal output from the optical modulation unit 1e and outputs a monitor signal.

The reference signal output unit 1g outputs a reference signal in phase with the pilot signal contained in the monitor signal.

The synchronous pilot-signal detection unit 1h performs synchronous detection of the monitor signal output from the monitor unit 1f in accordance with the reference signal.

The synchronous noise detection unit 1i extracts noise from the monitor signal output from the monitor unit 1f and performs synchronous detection in accordance with the reference signal. The synchronous noise detection unit 1i includes a band elimination filter (BEF) for eliminating just the pilot signal from the monitor signal, for instance. With the BEF, the synchronous noise detection unit 1i performs synchronous detection of the noise contained in the monitor signal.

The control signal output unit 1j subtracts the synchronous detection value of the synchronous noise detection unit 1i from the synchronous detection value of the synchronous pilot-signal detection unit 1h and outputs a control signal. The control signal output unit 1j outputs the control signal based on the synchronous detection value obtained by eliminating the noise to the bias voltage generation unit 1b. The bias voltage generation unit 1b controls the operating point of the optical modulation unit 1e in accordance with the control signal, with noise eliminated.

The optical communication apparatus performs synchronous detection of the monitor signal obtained by monitoring the level of the optical signal output from the optical modulation unit 1e in accordance with the reference signal. In addition, noise is extracted from the monitor signal, and synchronous detection of the extracted noise is performed in accordance with the reference signal. A control signal obtained by subtracting the synchronous detection value of the noise from the synchronous detection value of the monitor signal is output to the bias voltage generation unit 1b for generating a bias voltage. With this, a component based on the noise is eliminated from the synchronous detection value of the monitor signal. Therefore, an appropriate bias voltage can be generated, and the operating point of the optical modulation unit 1e can be appropriately controlled.

A first embodiment of the present invention will be described below in detail with reference to the drawings.

Figure 2:
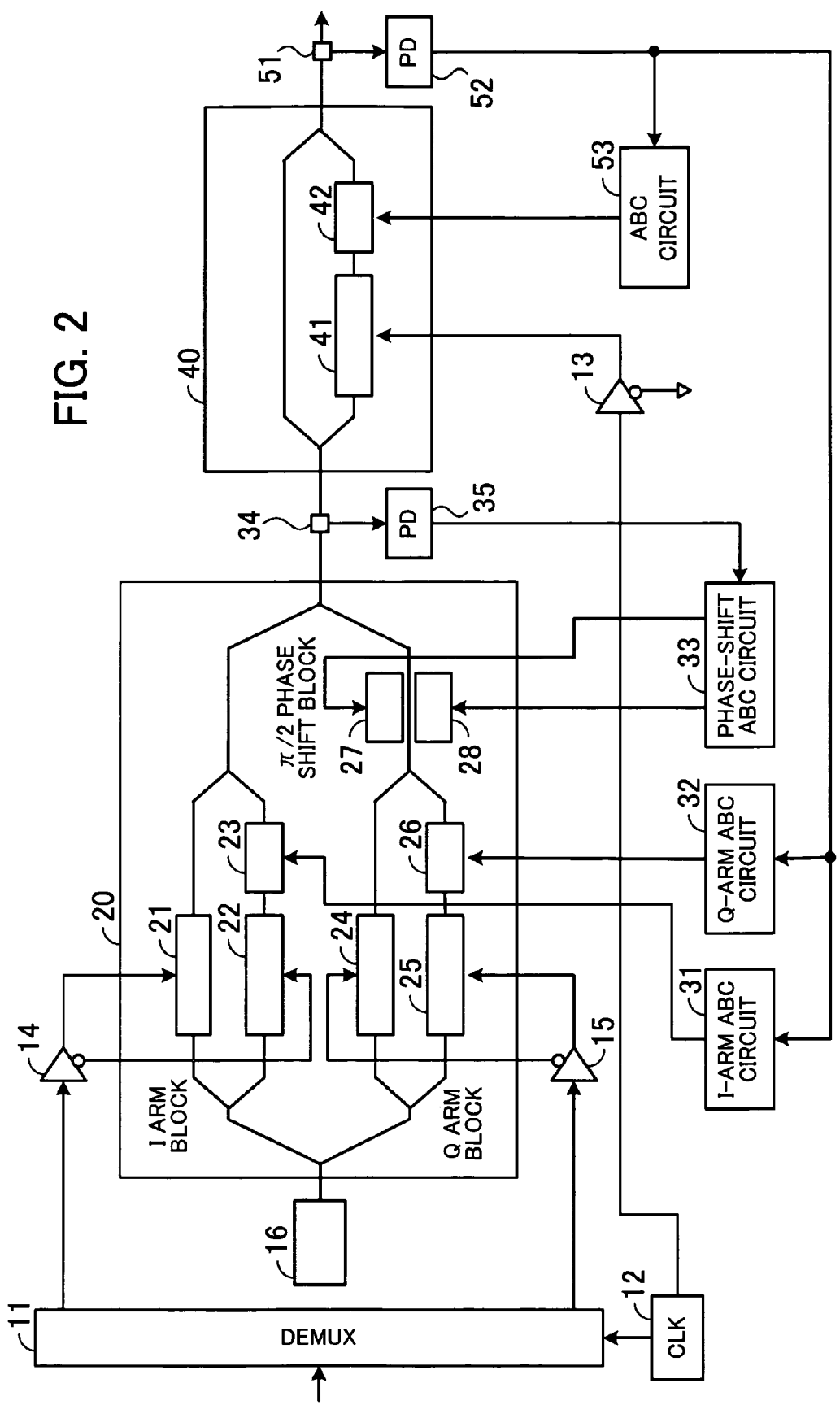
FIG. 2 is a block diagram showing the configuration of an optical communication apparatus of a first embodiment.
Figure 12:
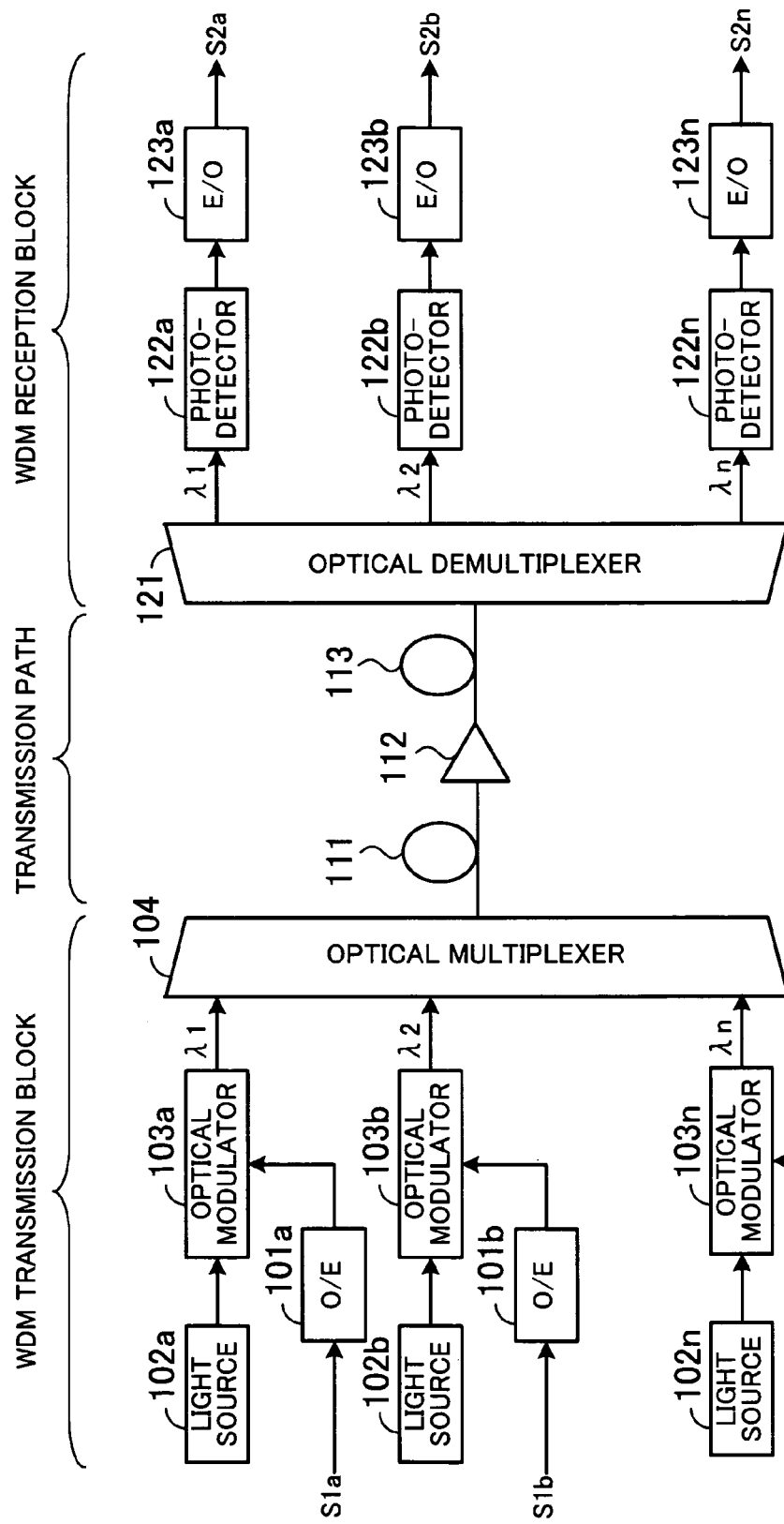
FIG. 12 is a view showing an example configuration of an optical communication system.

FIG. 2 is a block diagram showing the configuration of an optical communication apparatus of the first embodiment. The shown optical communication apparatus corresponds to the O/E 101a, the light source 102a, and the optical modulator 103a of the WDM transmission block, described with reference to FIG. 12. The shown optical communication apparatus performs optical modulation of an electrical signal and outputs the signal to the optical multiplexer 104.

A DEMUX 11 receives an electrical signal transmitted to the WDM reception block. The electrical signal input to the DEMUX 11 is a 43-Gb/s signal, for instance. The DEMUX 11 also receives a 21.5-GHz clock from a CLK 12, divides the input electrical signal into two 21.5-Gb/s signals, and outputs the signals to amplifiers 14 and 15, for instance.

The amplifier 14 amplifies an electrical signal output from one end of the DEMUX 11 and outputs signals to modulating electrodes 21 and 22 of an optical phase modulator 20. The amplifier 15 amplifies an electrical signal output from the other end of the DEMUX 11 and outputs signals to modulating electrodes 24 and 25 of the optical phase modulator 20.

Light output from a light source 16 is input to the optical phase modulator 20. The light source 16 is formed, for instance, of a laser diode (LD). The optical phase modulator 20 modulates the light output from the light source 16 in accordance with the electrical signals output from the amplifiers 14 and 15. The optical phase modulator 20 is a differential quadrature phase-shift keying (DQPSK) MZ optical modulator, for instance.

The modulating electrodes 21 and 22 and an electrode 23 of the optical phase modulator 20 form an I arm block. The modulating electrodes 24 and 25 and an electrode 26 form a Q arm block. Electrodes 27 and 28 form a $\pi/2$ phase shift block. The electrical signals output from the amplifier 14 are modulated to optical signals having phases of $\pi/4$ and $5\pi/4$, for instance. The electrical signals output from the amplifier 15 are modulated to optical signals having phases of $\pi/4$ and $5\pi/4$, and given a phase shift of $\pi/2$ by the $\pi/2$ phase shift block to be optical signals having phases of $3\pi/4$ and $7\pi/4$. In other words, the electrical signal input to the DEMUX 11 is transmitted in four states (transmitted as two bits), and the transmission is implemented at 21.5 Gb/s×2=43 Gb/s.

An interference-type optical modulation element applies a direct-current bias voltage to a modulation signal in order to fix the operating point of electrical-optical conversion to a certain position, as described above. The operating point of electrical-optical conversion by the interference-type optical modulation element varies with temperature, time, applied voltage, or the like, and a drift is generated. An I-arm ABC circuit 31 converts a part of the optical signal taken by an optical tap 51 and a PD 52 to an electrical signal, monitors a pilot signal contained in the optical signal, and controls the bias voltage to be applied to the electrode 23 of the I arm block. A Q-arm ABC circuit 32 converts the part of the optical signal taken by the optical tap 51 and the PD 52 to an electrical signal, monitors the pilot signal contained in the optical signal, and controls the bias voltage to be applied to the electrode 26 of the Q arm block. A phase-shift ABC circuit 33 converts a part of the optical signal taken by an optical tap 34 and a PD 35 to an electrical signal, monitors the pilot signal contained in the optical signal, and controls the bias voltages to be applied to the electrodes 27 and 28 of the $\pi/2$ phase shift block. Through those operations, the operating point of the optical phase modulator 20 is appropriately controlled.

A modulating electrode 41 of a return-to-zero (RZ) optical intensity modulator 40 receives the clock output from the CLK 12 through an amplifier 13. The RZ optical intensity modulator 40 modulates the optical signal output from the optical phase modulator 20 to an RZ optical signal. The modulated RZ optical signal is output to the optical multiplexer 104 shown in FIG. 12, for instance.

An ABC circuit 53 converts the part of the optical signal extracted by the optical tap 51 and the PD 52 to an electrical signal, monitors the pilot signal contained in the optical signal, and controls the bias voltage to be applied to an electrode 42 of the RZ optical intensity modulator 40. Through the operation, the operating point of the RZ optical intensity modulator 40 is appropriately controlled.

As the current WDM systems achieve increasing speeds and increasing capacities, development for increasing the transmission capabilities of optical communication apparatuses from 10 Gb/s to 40 Gb/s is proceeding. Accordingly, an optical phase modulation technique (optical phase modulator 20) is used in addition to the optical intensity modulation technique, as shown in FIG. 2.

The pilot signal output from the phase-shift ABC circuit 33 is very small and is likely to be buried in noise in the optical phase modulator 20. Accordingly, it becomes hard for the phase-shift ABC circuit 33 to control the operating point appropriately.

The relationship between the pilot signal and noise in the optical intensity modulator and the relationship between the pilot signal and noise in the optical phase modulator will be described.

Figure 3:
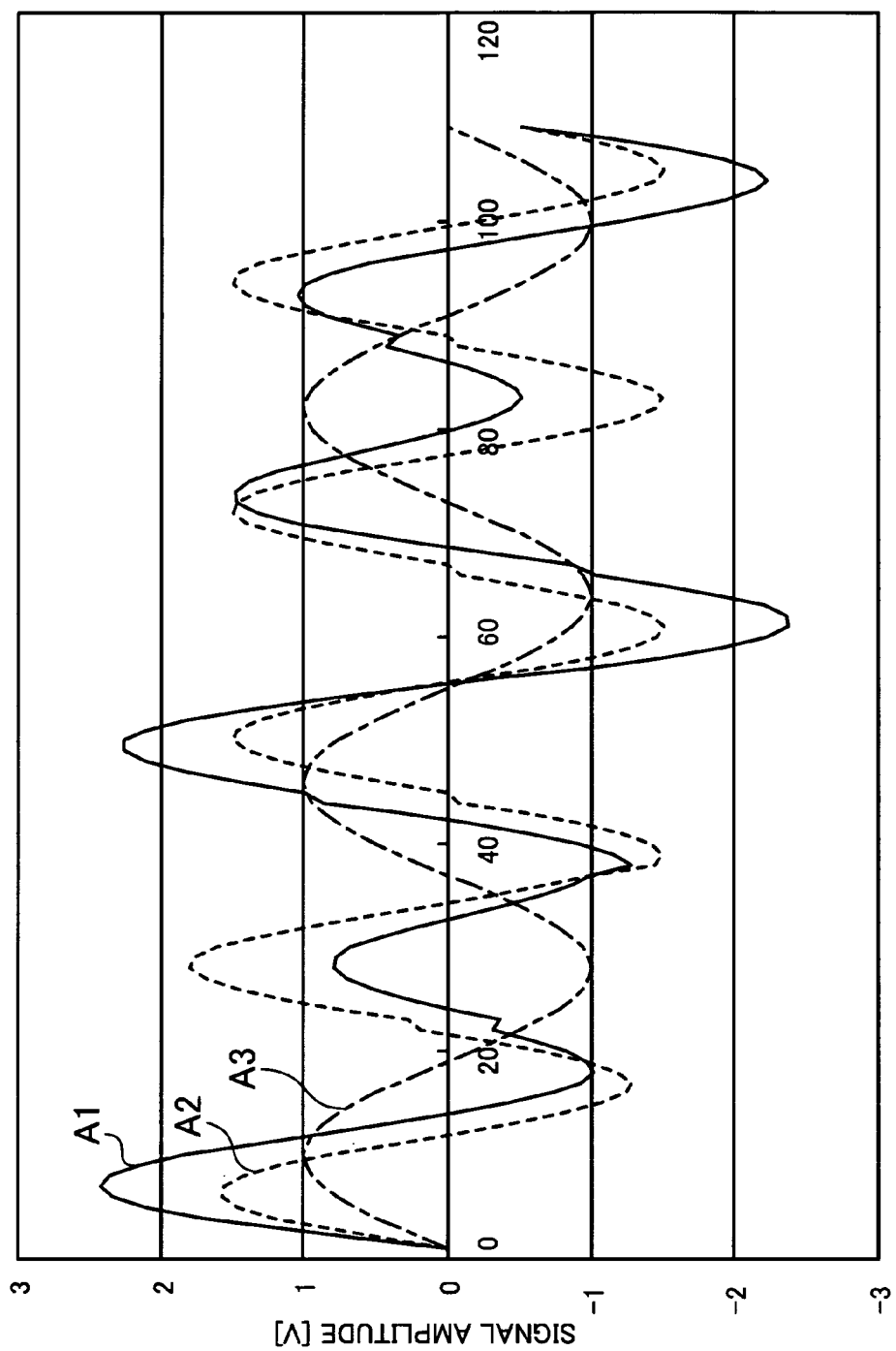
FIG. 3 is a view showing the relationship between a pilot signal and noise in an optical intensity modulator.
Figure 14:
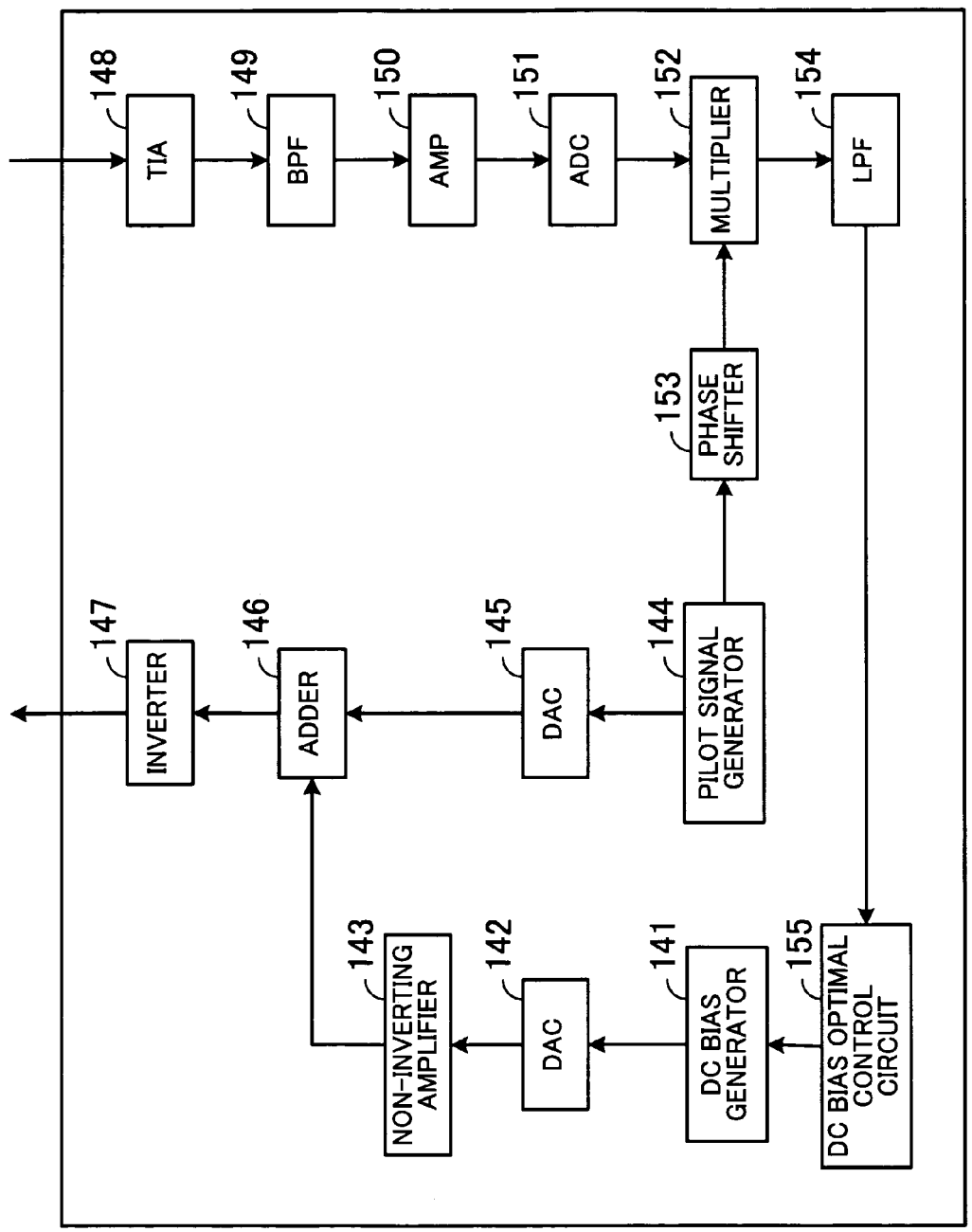
FIG. 14 is a block diagram showing the configuration of an ABC circuit.
Figure 15A:
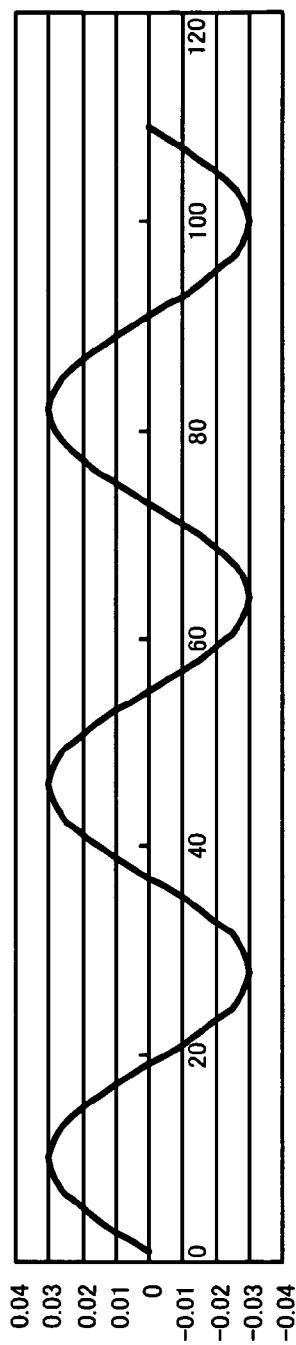
FIGS. 15A to 15C illustrate synchronous detection of a pilot signal.
Figure 15B:
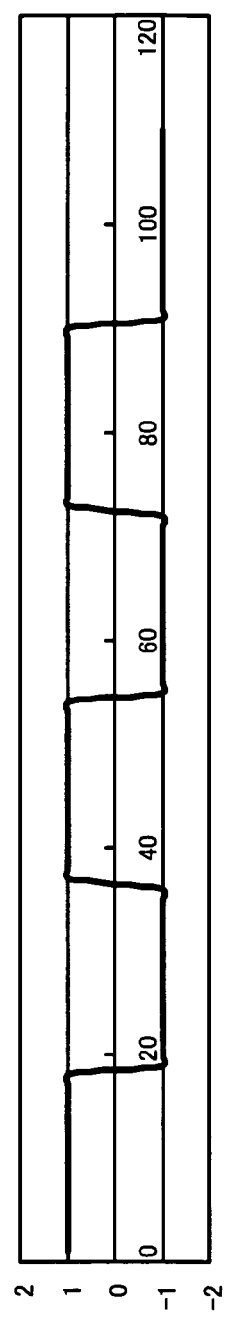
Figure 15C:
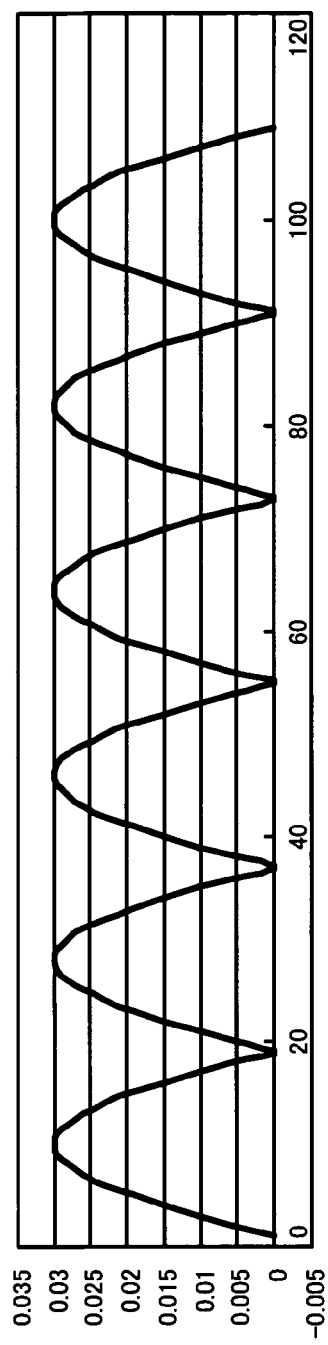

FIG. 3 is a view showing the relationship between the pilot signal and noise in the optical intensity modulator. A waveform A1 shown in the figure represents the electrical signal (pilot signal containing noise) output from the BPF 149 shown in FIG. 14. A waveform A2 represents a noise component contained in the waveform A1. A waveform A3 represents the pilot signal contained in waveform A1.

Synchronous detection of the waveform A1 would give a value of 0.5879. Synchronous detection of the waveform A2 representing the noise component of the waveform A1 would give a value of −0.0413. Synchronous detection of the waveform A3 representing the pilot signal would give a value of 0.6292. The difference between the synchronous detection value of the electrical signal output from the BPF 149 and the synchronous detection value of the noise component equals the synchronous detection value of the pilot signal represented by the waveform A3. Accordingly, the synchronous detection value of the electrical signal output from the BPF 149 minus the offset value of the noise component equals the synchronous detection value of the pilot signal.

A comparison between the synchronous detection value of 0.5879 of the waveform A1 representing the electrical signal output from the BPF 149 and the synchronous detection value of −0.0413 of the waveform A2 representing the noise component shows a large difference, which means that the effect of noise on the synchronous detection value of the waveform A1 is very small. This means that the effect of noise is small in the optical intensity modulator even if the LPF 15 performs synchronous detection of the electrical signal output from the BPF 149.

The relationship between the pilot signal and noise in the optical phase modulator will next be described. Before that, a conventional phase-shift ABC circuit for controlling the operating point of the optical phase modulator 20 shown in FIG. 2 will be described.

Figure 4:
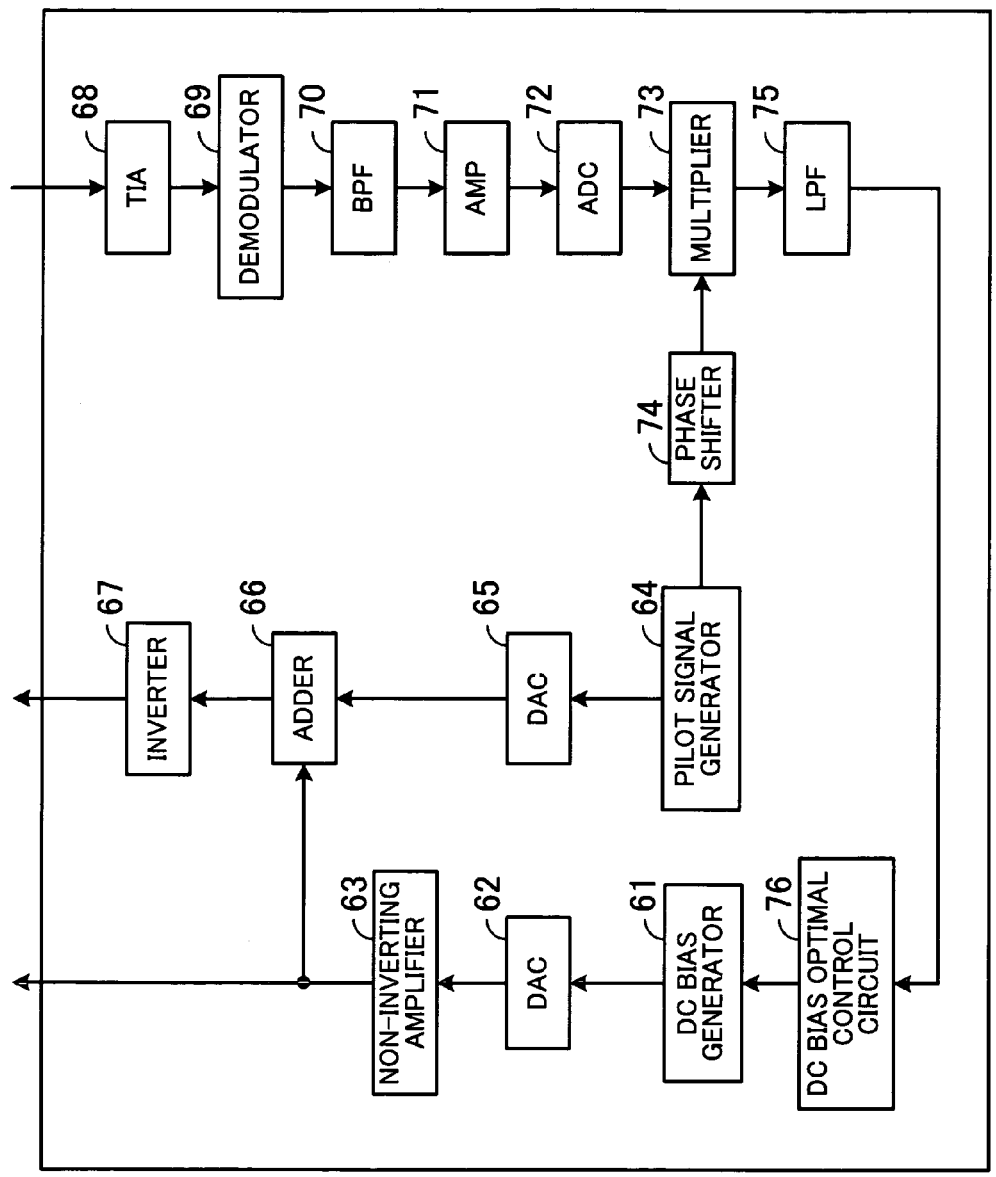
FIG. 4 is a block diagram of a conventional phase-shift automatic bias control (ABC) circuit.

FIG. 4 is a block diagram of the conventional phase-shift ABC circuit. In the shown phase-shift ABC circuit, a DC bias generator 61 outputs a digital bias voltage which determines the operating point of the optical modulation signal. A DAC 62 converts the bias voltage to an analog signal, and a non-inverting amplifier 63 amplifies the voltage. The analog bias voltage is output from the non-inverting amplifier 63 to an adder 66 and the electrode 27 of the optical phase modulator 20 shown in FIG. 2.

A pilot signal generator 64 outputs a pilot signal having a 1-kHz sinusoidal wave to a DAC 65 and a phase shifter 74. The DAC 65 converts the pilot signal output from the pilot signal generator 64 to an analog signal. An adder 66 adds the converted analog pilot signal and the bias voltage, and an inverter 67 inverts the output. The inverter 67 outputs the inversion of the sum of the pilot signal and the bias voltage to the electrode 28 of the optical phase modulator 20 shown in FIG. 2.

The optical signal containing the pilot signal, modulated by the optical phase modulator 20 goes through a waveguide of the optical phase modulator 20, and the optical tap 34 branches the signal to the PD 35. The PD 35 detects the optical level of the branched optical signal and outputs a corresponding electrical signal. A TIA 68 extracts an alternating-current component of the electrical signal output from the PD 35 and performs current-voltage conversion.

The pilot signal contained in the electrical signal converted by the TIA 68 was modulated in accordance with a data signal and is carried on a sideband. A demodulator 69 demodulates the pilot signal on the sideband. A BPF 70 having a center frequency of 1 kHz filters the pilot signal demodulated by the demodulator 69. An AMP 71 amplifies the filtered pilot signal in accordance with the input range of an ADC 72, and the signal is converted to a digital signal.

The phase shifter 74 adjusts the phase of the pilot signal output from the pilot signal generator 64 in consideration of a change in phase of the pilot signal returned to a multiplier 73 and outputs the signal as a reference signal. The phase shifter 74 adjusts the phase of the pilot signal output by the pilot signal generator 64 so that the signal becomes in phase with the pilot signal output from the ADC 72.

The multiplier 73 multiplies the digital pilot signal converted by the ADC 72 by the reference signal output from the phase shifter 74 and outputs the result to an LPF 75. The LPF 75 extracts a direct-current component from the pilot signal multiplied by the multiplier 73 and outputs the component to a DC bias optimal control circuit 76.

In other words, the multiplier 73 and the LPF 75 perform synchronous detection of the pilot signal. While the bias voltage is at the optimum operating point, the result of the synchronous detection is 0 V. If the result is not 0 V, the DC bias optimal control circuit 76 adjusts the value of the bias voltage generated by the DC bias generator 61 accordingly, so that the optimum operating point can be maintained. Through the operation, the optimum bias voltage is maintained.

Figure 5:
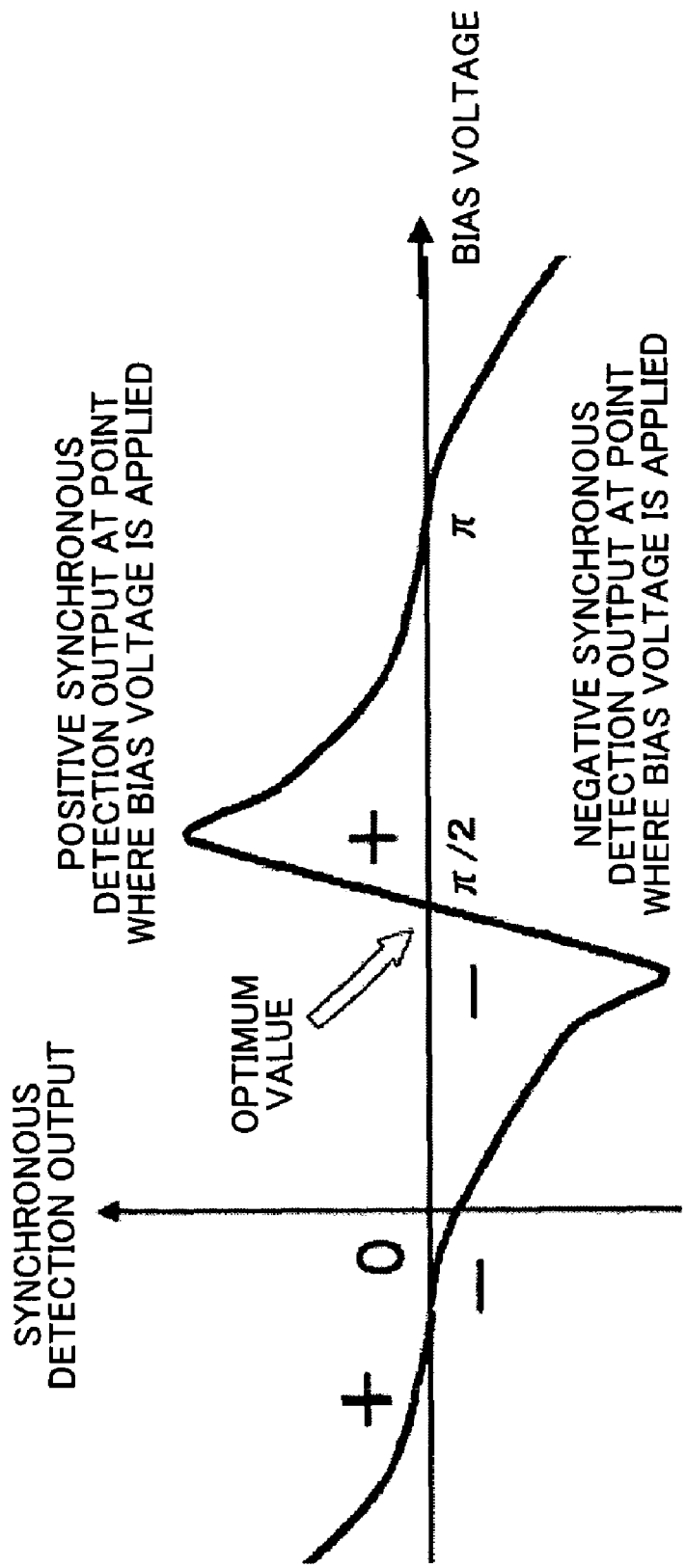
FIG. 5 is a view showing the relationship between a bias voltage and a synchronous detection output.

FIG. 5 is a view showing the relationship between the bias voltage and the synchronous detection output. The shown waveform represents the synchronous detection output of the phase-shift ABC circuit (output of the LPF 75) shown in FIG. 4.

As indicated by the shown waveform, the phase-shift ABC circuit brings the synchronous detection output to zero by controlling the bias voltage output from the DC bias generator 61 by means of the DC bias optimal control circuit 76. While the bias voltage is at the optimum value point shown in the figure, the synchronous detection output becomes zero, and the phase shift block is in a phase position of $\pi/2$.

Figure 6:
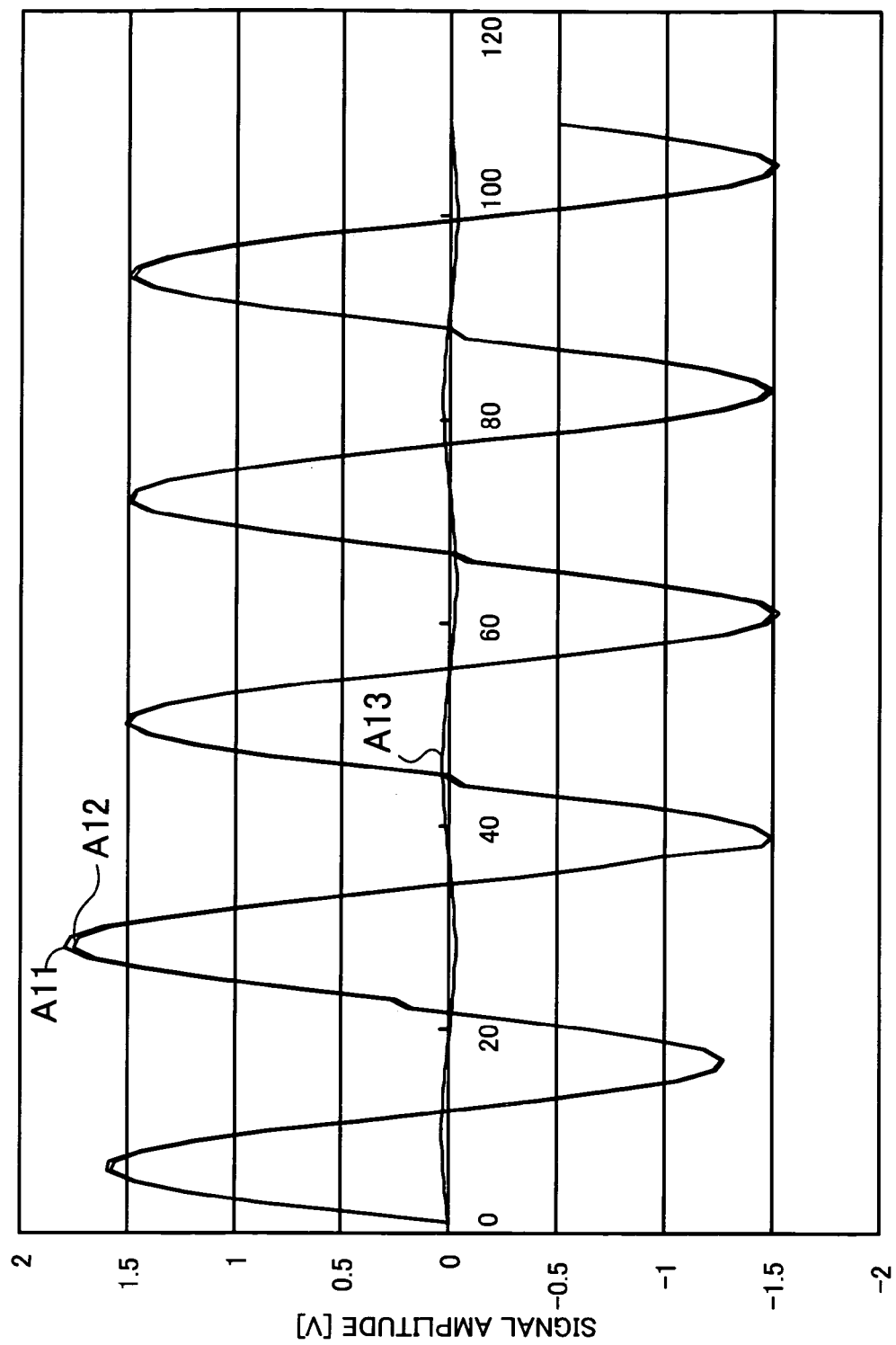
FIG. 6 is a view showing the relationship between the pilot signal and noise in an optical phase modulator.

FIG. 6 is a view showing the relationship between the pilot signal and noise in the optical phase modulator. A waveform A11 shown in the figure represents an electrical signal (pilot signal containing noise) output from the BPF 70 shown in FIG. 4. A waveform A12 represents the noise component contained in the waveform A11. A waveform A13 represents the pilot signal contained in the waveform A11.

Synchronous detection of the waveform A11 would give a value of −0.0245. Synchronous detection of the waveform A12 representing the noise component of the waveform A11 would give a value of −0.0434. Synchronous detection of the waveform A13 representing the pilot signal would give a value of 0.0189. The difference between the synchronous detection value of the electrical signal output from the BPF 70 and the synchronous detection value of the noise component equals the synchronous detection value of the pilot signal represented by the waveform A13. Accordingly, the synchronous detection value of the electrical signal output from the BPF 70 minus the offset value of the noise component equals the synchronous detection value of the pilot signal.

A comparison between the synchronous detection value of −0.0245 of the waveform A11 representing the electrical signal output from the BPF 70 and the synchronous detection value of −0.0434 of the waveform A12 representing the noise component does not show a large difference, unlike the synchronous detection values of the waveforms A1 and A2 shown in FIG. 3. The synchronous detection value of the waveform A13 is positive while the synchronous detection value of the waveform A11 is negative. The two values are opposite in polarity.

The pilot signal is very small, as represented by the waveform A13, and is likely to be buried in noise in the optical phase modulator 20. If the LPF 75 performs synchronous detection of the electrical signal output from the BPF 70, noise has a great influence, and it is hard to control the bias voltage appropriately.

The phase-shift ABC circuit 33 shown in FIG. 2 extracts and cancels out a noise component contained in the pilot signal.

Figure 7:
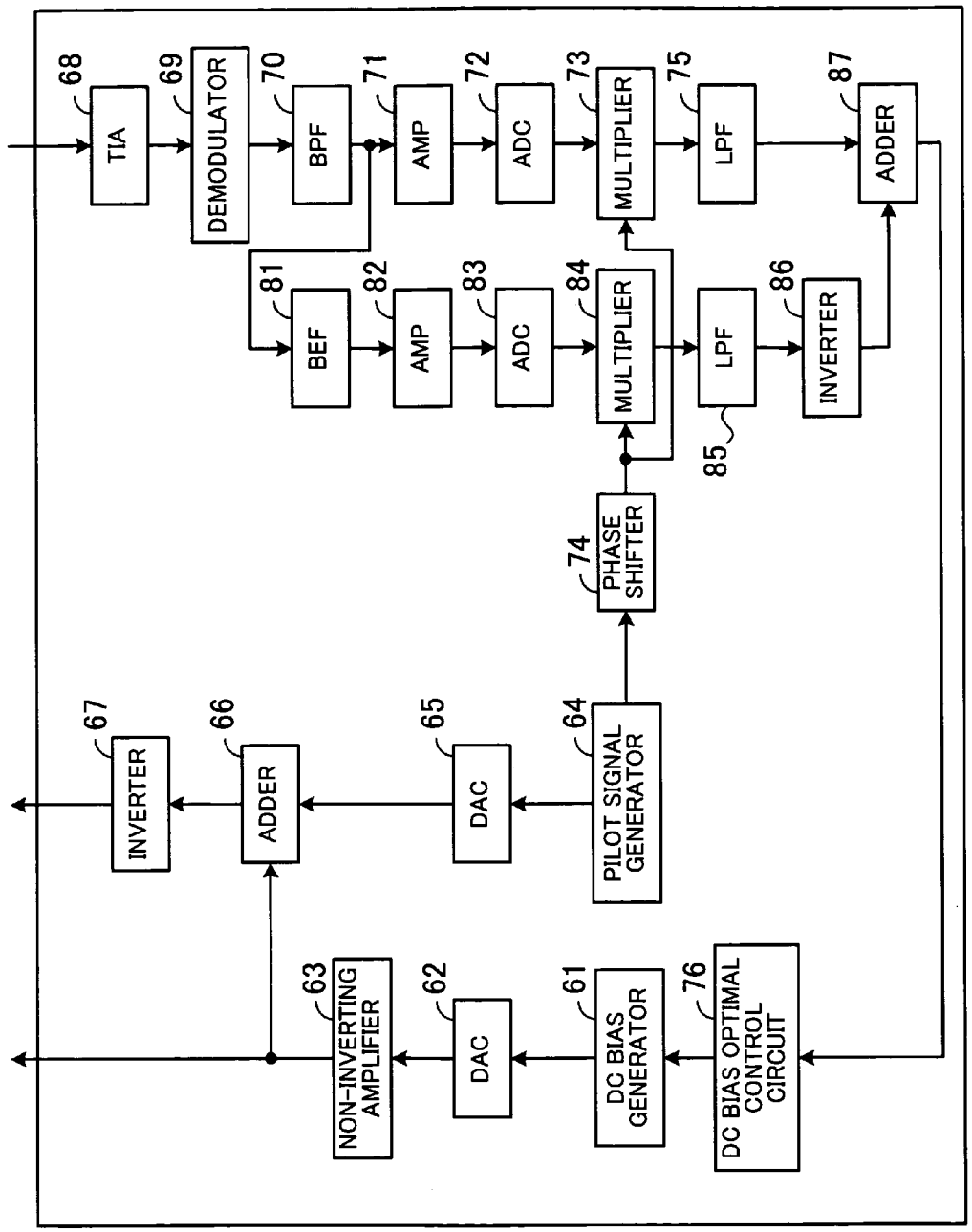
FIG. 7 is a block diagram of a phase-shift ABC circuit shown in FIG. 2.

FIG. 7 is a block diagram of the phase-shift ABC circuit 33 shown in FIG. 2. Unlike the conventional phase-shift ABC circuit shown in FIG. 4, the phase-shift ABC circuit 33 shown in FIG. 7 includes a BEF 81, an AMP 82, an ADC 83, a multiplier 84, an LPF 85, an inverter 86, and an adder 87. In FIG. 7, circuits identical to those shown in FIG. 4 are denoted by the same reference numerals, and a description thereof is omitted.

The BEF 81 receives the pilot signal output from the BPF 70. The pilot signal output from the BPF 70 is an electrical signal containing noise because it goes through the optical phase modulator 20 and other circuits.

The BEF 81 attenuates the 1-kHz pilot signal contained in the electrical signal. In other words, the BEF 81 extracts only the noise component from the electrical signal output from the BPF 70.

The AMP 82 amplifies the noise component in accordance with the input range of the ADC 83. The ADC 83 converts the noise component amplified by the AMP 82 to a digital signal.

The multiplier 84 multiplies the noise component converted to the digital signal by the ADC 83 by the reference signal output from the phase shifter 74 and outputs the result to the LPF 85. The LPF 85 changes the noise component multiplied by the reference signal by means of the multiplier 84 to a direct-current component. In other words, the multiplier 84 and the LPF 85 perform synchronous detection of the noise component. The noise component obtained by synchronous detection is output to the inverter 86 and inverted.

The adder 87 adds the synchronous detection value of the pilot signal containing noise, obtained by the multiplier 73 and the LPF 75, and the synchronous detection value of the noise component, obtained by the multiplier 84 and the LPF 85 and inverted by the inverter 86.

The adder 87 subtracts the synchronous detection value of the noise component from the synchronous detection value of the pilot signal containing the noise component output from the BPF 70 and gives the synchronous detection value of the pilot signal only.

The adder 87 outputs the synchronous detection value of the pilot signal with the noise component eliminated to the DC bias optimal control circuit 76. The DC bias optimal control circuit 76 adjusts the operating point of the optical phase modulator 20 appropriately in accordance with the synchronous detection value of the pilot signal with the noise component eliminated.

The PD 35 monitors the level of the optical signal output from the optical phase modulator 20, and the synchronous detection of the monitored signal is performed with the use of the reference signal. The BEF 81 extracts noise from the monitored signal, and the synchronous detection of the extracted noise is performed with the use of the reference signal. The synchronous detection value of the pilot signal containing noise and the synchronous detection value of the inverted noise are added. This eliminates the noise component from the synchronous detection value of the pilot signal, and an appropriate bias voltage can be generated. The operating point of the optical phase modulator 20 can be controlled appropriately.

The pilot signal can be detected with a higher precision while the optical power of the light source 16 varies, so that the dynamic range of the optical power of the light source 16 can be extended.

Figure 13:
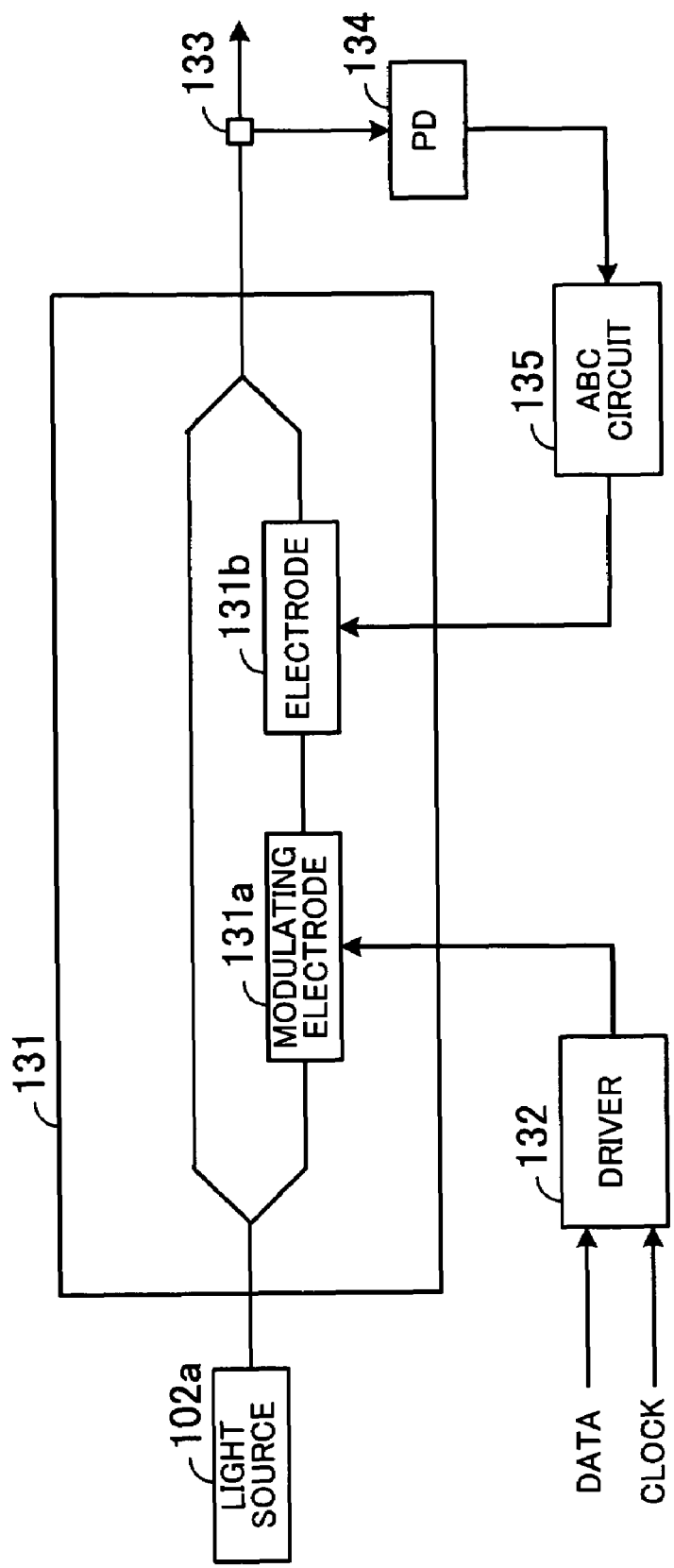
FIG. 13 is a block diagram showing the configuration of a conventional optical modulator.

The above description of the phase-shift ABC circuit 33 for controlling the operating point of the optical phase modulator 20 can also be applied to the I-arm ABC circuit 31 and the Q-arm ABC circuit 32. The description can further be applied to the ABC circuit 135 for controlling the operating point of the optical intensity modulator 131 shown in FIG. 13. The description can be applied not only to ABC circuits for controlling the operating points of optical phase modulators but also to ABC circuits of optical modulators having noise buried in the pilot signal.

A second embodiment will be described next in detail with reference to the drawings. In the first embodiment, the BEF 81 described with reference to FIG. 7 extracts noise from the pilot signal output from the BPF 70. In the second embodiment, the noise component is detected by controlling the phase of the reference signal output from the phase shifter 74, and the BEF 81, the AMP 82, and the ADC 83 for processing the analog signal are eliminated.

Figure 8:
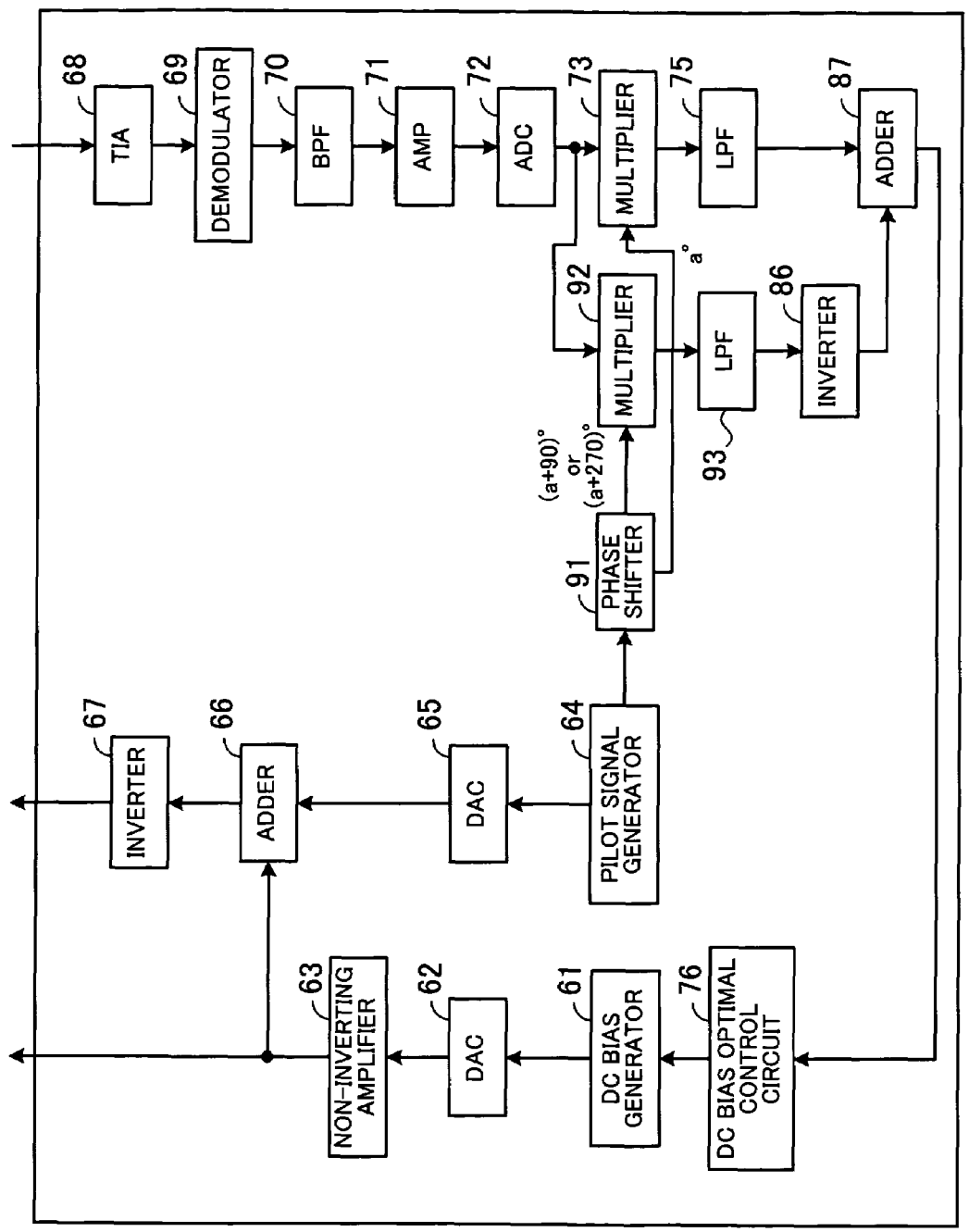
FIG. 8 is a block diagram showing the configuration of an optical communication apparatus of a second embodiment.

FIG. 8 is a block diagram showing the configuration of an optical communication apparatus of the second embodiment. In FIG. 8, circuits identical to those shown in FIG. 7 are denoted by the same reference numerals, and a description thereof is omitted.

A phase shifter 91 adjusts the phase of the pilot signal output from the pilot signal generator 64 so that the signal becomes in phase with the pilot signal output from the ADC 72, and outputs the signal to a multiplier 73 as a reference signal. The phase shifter 91 also outputs a reference signal 90° out of phase from the reference signal output to the multiplier 73 to a multiplier 92.

Suppose that the phase shifter 91 outputs a reference signal "a" degrees out of phase from the pilot signal to the multiplier 73. The phase shifter 91 outputs a reference signal (a+90) degrees out of phase from the pilot signal to the multiplier 92. Alternatively, the phase shifter 91 outputs a reference signal (a−90) degrees (=(a+270) degrees) out of phase from the pilot signal to the multiplier 92.

The multiplier 73 receives the "a"-degree reference signal output from the phase shifter 91 and the pilot signal digitized by the ADC 72. The multiplier 73 multiplies the "a"-degree reference signal output from the phase shifter 91 by the pilot signal digitized by the ADC 72 and outputs the result to the LPF 75. The LPF 75 changes the output of the multiplier 73 to a direct-current component. The LPF 75 outputs the synchronous detection value of the pilot signal.

The multiplier 92 receives the (a+90)-degree or (a−90)-degree reference signal output from the phase shifter 91 and the pilot signal digitized by the ADC 72. The multiplier 92 multiplies the (a+90)-degree or (a−90)-degree reference signal output from the phase shifter 91 by the pilot signal digitized by the ADC 72, and outputs the result to the LPF 93. The LPF 93 turns the output of the multiplier 92 into a direct-current component. The LPF 93 outputs the synchronous detection value of the noise component. The LPF 93 and the multiplier 92 forming a synchronous detection circuit form a BEF and extracts a noise component from the pilot signal output from the ADC 72 and outputs the synchronous detection value.

The principle of the BEF formed by a synchronous detection circuit will be described.

Figure 9A:
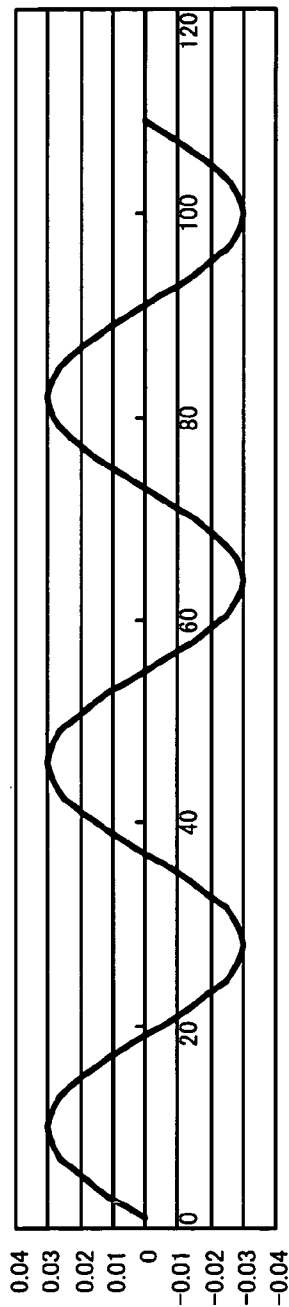
FIGS. 9A to 9C illustrate the principle of a band elimination filter (BEF) formed by a synchronous detection circuit.
Figure 9B:
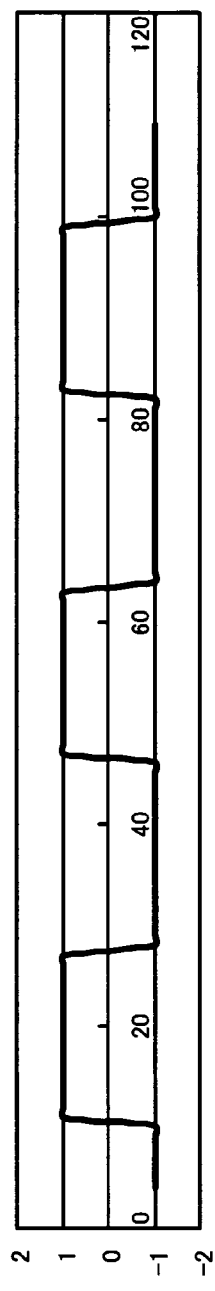
Figure 9C:
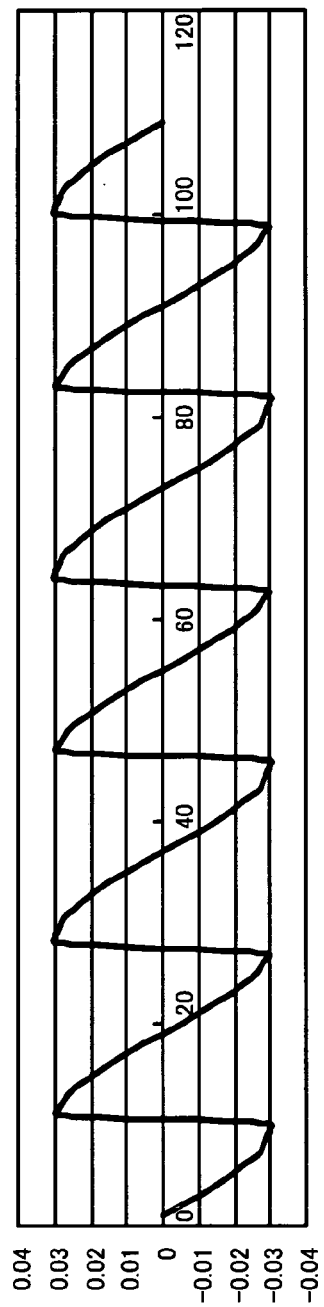

FIGS. 9A to 9C illustrate the principle of a BEF formed by a synchronous detection circuit. The pilot signal output from the ADC 72 is shown in FIG. 9A. The reference signal output from the phase shifter 91 to the multiplier 92 is shown in FIG. 9B. The result output by the multiplier 92 is shown in FIG. 9C.

The reference signal output to the multiplier 92 leads the pilot signal output from the ADC 72 by 90°, as shown in FIG. 9B. The product of the pilot signal output from the ADC 72 and the reference signal output from the phase shifter 91 becomes as shown in FIG. 9C.

When the waveform shown in FIG. 9C is turned into a direct-current component by the LPF 93, the value becomes zero. That is, the synchronous detection of the pilot signal (shown in FIG. 9A) output from the ADC 72 by means of the multiplier 92 and the LPF 93 gives a value of zero. If the pilot signal output from the ADC 72 contains noise, the synchronous detection value of the pilot signal by the multiplier 92 and the LPF 93 becomes zero, and the LPF 93 outputs the synchronous detection value of the noise component alone.

With the BEF formed by the multiplier 92 and the LPF 93, the noise component can be extracted from the pilot signal, and the synchronous detection value of the pilot signal with the noise component eliminated can be obtained. The BEF can be formed by the multiplier 84 and the LPF 85 for processing the digital signal, without analog circuits, which are the BEF 81, the AMP 82, and the ADC 83 described with reference to FIG. 7, and the size of the hardware can be reduced.

A third embodiment of the present invention will be described next with reference to the drawings. In the first embodiment, the output of the BPF 70 described with reference to FIG. 7 is supplied to the AMP 71 and the BEF 81. In the third embodiment, the BPF 70 is omitted, and the output of the demodulator 69 is given to the AMP 71 and the BEF 81.

Figure 10:
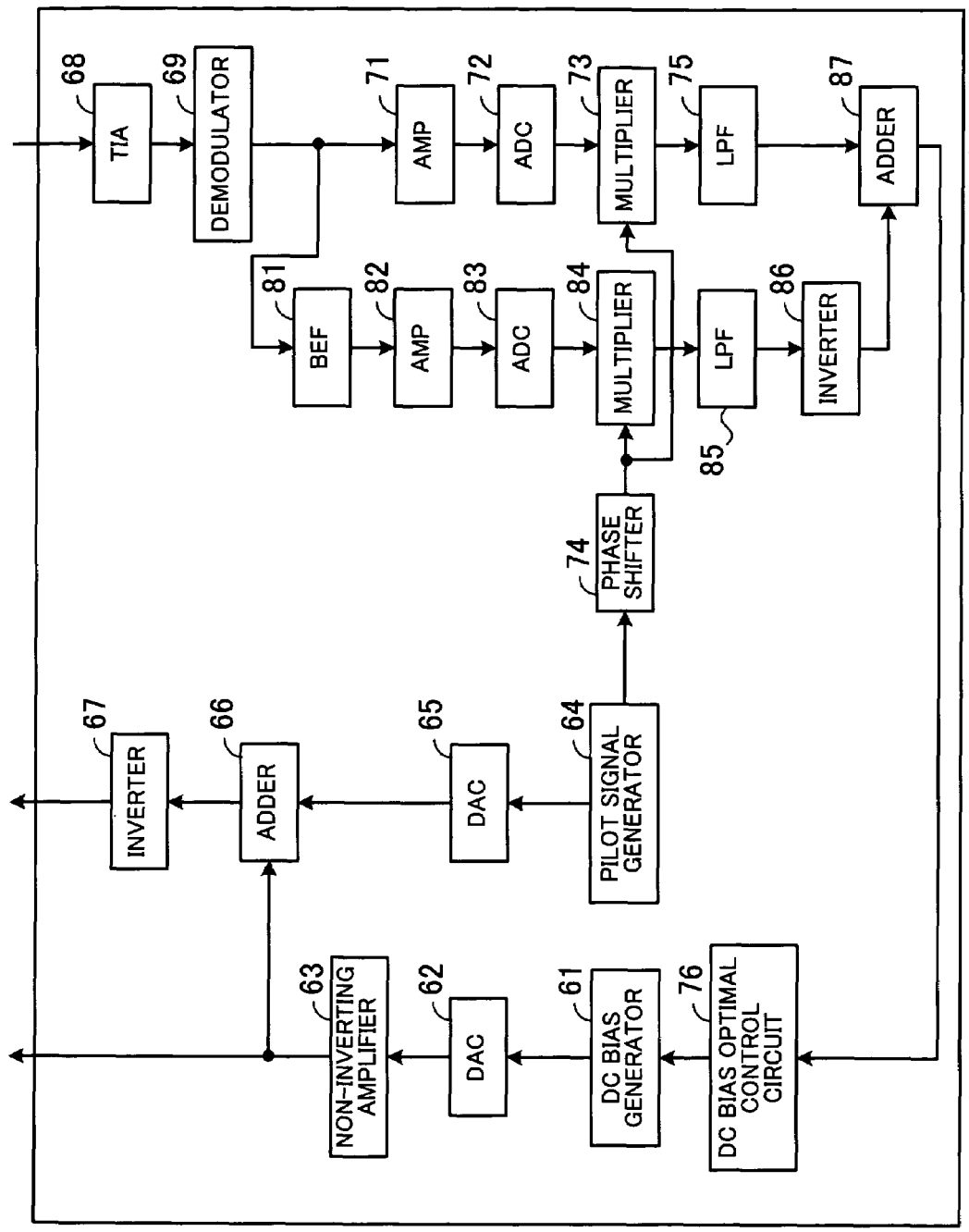
FIG. 10 is a block diagram showing the configuration of an optical communication apparatus of a third embodiment.

FIG. 10 is a block diagram showing the configuration of an optical communication apparatus of the third embodiment. In FIG. 10, circuits identical to those shown in FIG. 7 are denoted by the same reference numerals, and a description thereof will be omitted.

In FIG. 10, the BPF 70 included in FIG. 7 is omitted. The output of the demodulator 69 is given to the AMP 71 and BEF 81.

The multiplier 73 and LPF 75 perform synchronous detection of the pilot signal and also function as a BPF. When a great influence of noise is found in the synchronous detection of the pilot signal, the BPF 70 can be disposed after the demodulator 69, as shown in FIG. 7, in order to remove signals having frequencies other than 1 kHz.

The BPF 70 can be omitted if the influence of noise is small. Accordingly, the number of components can be reduced.

If a direct-current voltage is applied to the output of the demodulator 69, a circuit for removing the direct-current component is disposed after the demodulator 69. For instance, a capacitor or the like may be connected at the output side of the demodulator 69.

A fourth embodiment of the present invention will be described next with reference to the drawings. In the second embodiment, the output of the demodulator 69 described with reference to FIG. 8 is filtered by the BPF 70 and output to the AMP 71. In the fourth embodiment, the BPF 70 is omitted, and the output of the demodulator 69 is supplied to the AMP 71.

Figure 11:
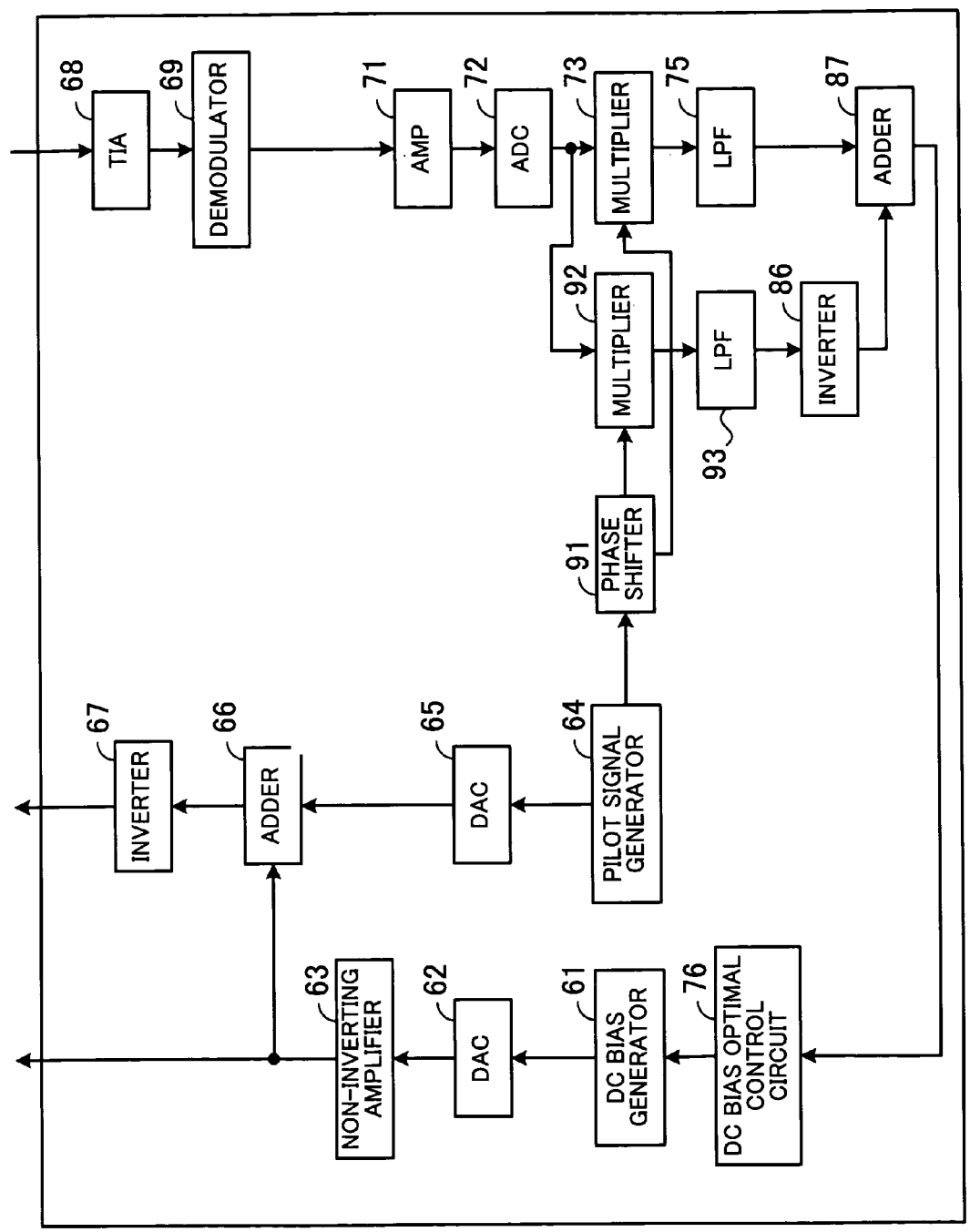
FIG. 11 is a block diagram showing the configuration of an optical communication apparatus of a fourth embodiment.

FIG. 11 is a block diagram showing the configuration of an optical communication apparatus of the fourth embodiment. In FIG. 11, circuits identical to those shown in FIG. 8 are denoted by the same reference numerals, and a description thereof will be omitted.

In FIG. 11, the BPF 70 shown in FIG. 8 is omitted. The output of the demodulator 69 is given to the AMP 71.

The multiplier 73 and LPF 75 perform synchronous detection of the pilot signal and also function as a BPF. When a great influence of noise is found in the synchronous detection of the pilot signal, the BPF 70 can be disposed after the demodulator 69, as shown in FIG. 8, in order to remove signals having frequencies other than 1 kHz.

The BPF 70 can be omitted if the influence of noise is small. Accordingly, the number of components can be reduced.

If a direct-current voltage is applied to the output of the demodulator 69, a circuit for removing the direct-current component is provided after the demodulator 69. For instance, a capacitor or the like may be connected at the output side of the demodulator 69.

In an optical communication apparatus of the present invention, the level of the optical signal output from the optical modulation unit is monitored, and synchronous detection of the monitor signal is performed with the use of the reference signal. Noise is extracted from the monitor signal, and synchronous detection of noise is performed with the use of the reference signal. The synchronous detection value of noise is subtracted from the synchronous detection value of the monitor signal, and the result is output as a control signal to the bias voltage generation unit for generating a bias voltage. Accordingly, a component based on noise is removed from the synchronous detection value of the monitor signal, and an appropriate bias voltage can be generated, so that the operating point of the optical modulation unit can be controlled appropriately.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical communication apparatus for modulating an electrical signal to an optical signal and transmitting the optical signal, the optical communication apparatus comprising:
   a light source;
   a bias voltage generation means for generating a bias voltage in accordance with a control signal;
   a pilot signal generation means for generating a pilot signal;
   an adding means for adding the pilot signal and the bias voltage;

an optical modulation means for modulating light output from the light source in accordance with the electrical signal, performing modulation also in accordance with a signal from the adding means, and outputting the optical signal;

a monitor means for monitoring the level of the optical signal and outputting a monitor signal;

a reference signal output means for outputting a reference signal which is in phase with the pilot signal contained in the monitor signal;

a synchronous pilot-signal detection means for performing synchronous detection of the monitor signal by using the reference signal;

a synchronous noise detection means for extracting noise from the monitor signal and performing synchronous detection by using the reference signal; and a control signal output means for subtracting a synchronous detection value obtained by the synchronous noise detection means from a synchronous detection value obtained by the synchronous pilot-signal detection means, and outputting the control signal.

2. The optical communication apparatus according to claim 1, wherein the synchronous noise detection means comprises a band elimination filter for eliminating the pilot signal component from the monitor signal.

3. The optical communication apparatus according to claim 1, wherein the reference signal output means outputs a noise reference signal 90 degrees out of phase from the reference signal to the synchronous noise detection means; and the synchronous noise detection means performs synchronous detection by using the noise reference signal.

4. The optical communication apparatus according to claim 1, further comprising a band pass filter for allowing the pilot signal contained in the monitor signal to pass.

5. The optical communication apparatus according to claim 1, wherein the optical modulation means is a DQPSK-MZ optical phase modulator.

6. The optical communication apparatus according to claim 1, wherein the reference signal output means changes the phase of the pilot signal output from the pilot signal generation means so that the signal becomes in phase with the pilot signal contained in the monitor signal and outputs the result as the reference signal.

7. An automatic bias control circuit for controlling the operating point of an optical modulator, the automatic bias control circuit comprising:

a bias voltage generation means for generating a bias voltage for controlling the operating point of the optical modulator in accordance with a control signal;

a pilot signal generation means for generating a pilot signal;

an adding means for adding the pilot signal and the bias voltage;

a monitor means for monitoring the level of an optical signal output from the optical modulator and outputting a monitor signal;

a reference signal output means for outputting a reference signal which is in phase with the pilot signal contained in the monitor signal;

a synchronous pilot-signal detection means for performing synchronous detection of the monitor signal by using the reference signal;

a synchronous noise detection means for extracting noise from the monitor signal and performing synchronous detection by using the reference signal; and a control signal output means for subtracting a synchronous detection value obtained by the synchronous noise detection means from a synchronous detection value obtained by the synchronous pilot-signal detection means, and outputting the control signal.

* * * * *